(12) United States Patent
Lee

(10) Patent No.: US 12,052,307 B2
(45) Date of Patent: Jul. 30, 2024

(54) IMAGE PROCESSING DEVICE AND METHOD FOR OPERATING IMAGE PROCESSING DEVICE

(71) Applicant: SAMSUNG ELECTRONICS CO., LTD., Suwon-si (KR)

(72) Inventor: Sang Heon Lee, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/455,335

(22) Filed: Nov. 17, 2021

(65) Prior Publication Data
US 2022/0201060 A1 Jun. 23, 2022

(30) Foreign Application Priority Data
Dec. 23, 2020 (KR) .................. 10-2020-0181861

(51) Int. Cl.
H04L 65/70 (2022.01)
G06T 9/00 (2006.01)
H04L 65/61 (2022.01)
H04L 65/65 (2022.01)
H04N 19/182 (2014.01)
H04N 19/42 (2014.01)

(52) U.S. Cl.
CPC .............. *H04L 65/70* (2022.05); *G06T 9/007* (2013.01); *H04L 65/61* (2022.05); *H04L 65/65* (2022.05); *H04N 19/182* (2014.11); *H04N 19/42* (2014.11)

(58) Field of Classification Search
CPC ......... G06T 9/007; H04L 65/61; H04L 65/65; H04L 65/70; H04L 65/762; H04N 19/182; H04N 19/42; H04N 19/426
See application file for complete search history.

(56) References Cited

U.S. PATENT DOCUMENTS

| 5,689,346 A * | 11/1997 | Noda ................... G06F 17/147 348/250 |
| 6,650,784 B2 | 11/2003 | Thyagarajan |
| 8,660,193 B2 | 2/2014 | Rubinstein et al. |
| 9,712,817 B1 | 7/2017 | Cismas |
| 9,866,829 B2 | 1/2018 | Joshi et al. |
| 10,334,280 B2 | 6/2019 | Sasai et al. |
| 10,581,454 B2 | 3/2020 | Marpe et al. |
| 10,666,984 B2 | 5/2020 | Thirumalai et al. |
| 10,701,401 B2 | 6/2020 | Wu et al. |

(Continued)

Primary Examiner — Mohammed S Rahaman
(74) Attorney, Agent, or Firm — F. CHAU & ASSOCIATES, LLC

(57) ABSTRACT

The present disclosure provides an image processing device. The image processing device includes a multimedia processor that processes raw data of an image frame to generate image data and a frame buffer compressor that decompresses a first compression data stream compressed on a first image data of the first pixel by a variable bit rate (VBR) mode to generate a first output data. The decoder includes a first predecoder that generates a first data stream and a second predecoder that generates a second data stream different from the first data stream. The decoder outputs the first data based on the first data stream and outputs a second data based on the second compression data stream. A merger receives the first and second data. A decompression operation is performed on the first compression data stream based on the first and second data.

19 Claims, 19 Drawing Sheets

(56) References Cited

U.S. PATENT DOCUMENTS

| | | | |
|---|---|---|---|
| 2008/0107349 A1* | 5/2008 | Sung | H04N 19/91 |
| | | | 382/245 |
| 2014/0355690 A1 | 12/2014 | Choi et al. | |
| 2014/0362922 A1* | 12/2014 | Puri | H04N 19/196 |
| | | | 375/240.16 |
| 2015/0078443 A1 | 3/2015 | Kolesnikov | |
| 2016/0044314 A1* | 2/2016 | Rinaldi | H04N 19/18 |
| | | | 375/240.02 |
| 2016/0205404 A1* | 7/2016 | Zhu | H04N 19/146 |
| | | | 375/240.03 |
| 2016/0286215 A1 | 9/2016 | Gamei et al. | |

* cited by examiner

FIG. 16

| Q1_Rk (4bit) | Q[k]_[0] (2bit) | Q[k]_[1] (2bit) | Q[k]_[2] (2bit) | Q[k]_[3] (2bit) | QV[k](3bit) | numC[k] (3bit) | BP[k](1bit) |
|---|---|---|---|---|---|---|---|
| 0000 | - | - | - | - | 4 | 0 | 1 |
| 0001 | 0 | - | - | - | 3 | 1 | 0 |
| 0010 | 1 | - | - | - | 2 | 1 | 0 |
| 0011 | 0 | 0 | - | - | 2 | 2 | 0 |
| 0100 | 2 | - | - | - | 1 | 1 | 0 |
| 0101 | 0 | 1 | - | - | 1 | 2 | 0 |
| 0110 | 1 | 0 | - | - | 1 | 2 | 0 |
| 0111 | 0 | 0 | 0 | - | 1 | 3 | 0 |
| 1000 | 3 | - | - | - | 0 | 1 | 0 |
| 1001 | 0 | 2 | - | - | 0 | 2 | 0 |
| 1010 | 1 | 1 | - | - | 0 | 2 | 0 |
| 1011 | 0 | 0 | 1 | - | 0 | 3 | 0 |
| 1100 | 2 | 0 | - | - | 0 | 2 | 0 |
| 1101 | 0 | 1 | 0 | - | 0 | 3 | 0 |
| 1110 | 1 | 0 | 0 | - | 0 | 3 | 0 |
| 1111 | 0 | 0 | 0 | 0 | 0 | 4 | 0 |

IMAGE PROCESSING DEVICE AND METHOD FOR OPERATING IMAGE PROCESSING DEVICE

CROSS-REFERENCE TO RELATED APPLICATION

This application claims priority from Korean Patent Application No. 10-2020-0181861 filed on Dec. 23, 2020 in the Korean Intellectual Property Office, and all the benefits accruing therefrom under 35 U.S.C. 119, the contents of which are incorporated by reference herein in their entirety.

BACKGROUND

1. Field of the Invention

The present disclosure relates to an image processing device and a method for operating the image processing device.

2. Description of the Related Art

A device (e.g., such as a video device or an imaging display device) may include an image processing system. In some cases, such devices may use image processing systems to process and view high-definition video with a high frame rate. For example, a mobile phone or computer may be used to watch videos, live-streamed television shows, etc. With the increasing demand for high-definition images, high-definition video, and high frame-rate video, the bandwidth needed to view the corresponding image data increases.

As the bandwidth increases due to higher-definition image data, the processing capacity of the image processing system may need to be increased. In some cases where the processing capacity of the image processing system reaches a predetermined limit based on the software and hardware (e.g., some processing capability threshold), problems may arise such as a decrease in device speeds during recording or playback of high-definition and/or high-rate image frames. Decreased speeds adversely impact user experience or may result in more significant problems if the recording or playback occurs during a high-consequence scenario (e.g., such as during video playback in safety applications).

In signal processing, data compression, source coding, or bit-rate reduction is the process of encoding information using fewer bits than the original representation. Data compression has the potential to reduce the transmission bandwidth and reduce storage requirements of devices and corresponding image processing systems. In such cases, data may be compressed before data is written to device memory, and the compressed data may be decompressed before data is read from the memory (e.g., for reducing any data loss during playback of the compressed data). There is an increasing need in the art for efficient compression and decompression techniques.

SUMMARY

Aspects of the present disclosure provide an image processing device that performs optimized decompression of image data. Aspects of the present disclosure also provide a method for operating the image processing device that performs optimized decompression of image data. However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided an image processing device including a multimedia processor and a decoder. The multimedia processor may process raw data of an image frame to generate image data, wherein the image frame comprises at least a first pixel, a second pixel, and a third pixel. The frame buffer compressor may include a decoder that decompresses a first compression data stream to generate a first output data, wherein the first compression data stream comprises first image data of the first pixel compressed by a variable bit rate (VBR) mode. In some examples, the decoder includes a first predecoder, a second predecoder, and a merger. The first predecoder divides the first compression data stream into a predetermined number of bits to generate a first divided compression data stream, and the first predecoder may output first divided data based on the first divided compression data stream. The second predecoder divides the first compression data stream into the predetermined number of bits to generate a second divided compression data stream different from the first divided compression data stream, and the second predecoder may output second divided data based on the second divided compression data stream. The merger receives the first divided data and the second divided data, and the merger may perform a decompression operation on the first compression data stream based on the first divided data and the second divided data.

According to another aspect of the present disclosure, there is provided an image processing device comprising a multimedia processor and a frame buffer. The multimedia processor processes raw data of an image frame to generate image data, wherein the image frame comprises at least a first pixel, a second pixel, and a third pixel. The frame buffer compressor may include a decoder that decompresses a first compression data stream to generate a first output data, wherein the first compression data stream comprises first image data of the first pixel compressed by a Golomb-Rice mode. The decoder may include a first predecoder, a second predecoder, and a merger. The first predecoder generates a first divided compression data stream including at least a part of the first compression data stream, and the first predecoder may output first preliminary quotient data of the first compression data stream based on the first divided compression data stream. The second predecoder generates a second divided compression data stream including at least a part of the first compression data stream different from the first divided compression data stream, and the second predecoder may output second preliminary quotient data of the first compression data stream based on the second divided compression data stream. The merger receives the first preliminary quotient data and the second preliminary quotient data, and the merger may perform a decompression operation on the first compression data stream based on the first preliminary quotient data and the second preliminary quotient data.

According to another aspect of the present disclosure, there is provided a method for operation the image processing device, the method comprising receiving a first compression data stream generated by compressing a first image data of a first pixel by a VBR mode, equally dividing the first compression data stream into a predetermined number of bits to generate a first divided compression data stream and a second divided compression data stream, outputting a first divided data based on the first divided compression data stream, outputting a second divided data based on the second divided compression data stream, and decompressing the first compression data stream based on the first divided data and the second divided data to output first output data of the image data.

BRIEF DESCRIPTION OF THE DRAWINGS

The above and other aspects and features of the present disclosure will become more apparent by describing, in detail, embodiments thereof referring to the attached drawings, in which:

FIGS. 14 to 18 are diagrams for explaining the operation of the image processing device according to some embodiments of the present disclosure.

DETAILED DESCRIPTION OF THE EMBODIMENTS

Figure 1:
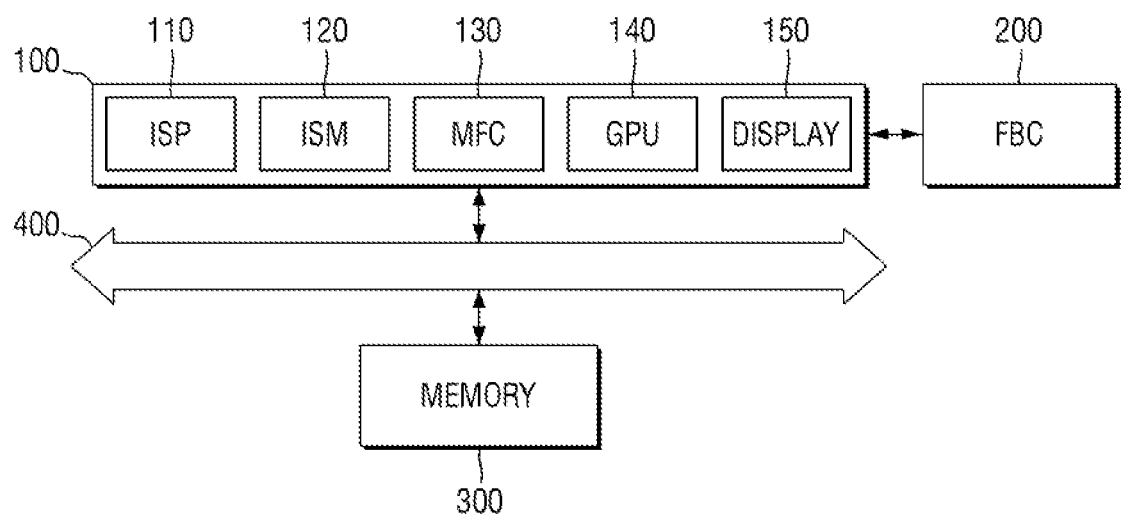
FIGS. 1 to 4 are block diagrams for explaining an image processing device according to some embodiments of the present disclosure.

The present disclosure relates generally to an image processing device. More particularly, embodiments of the present disclosure relate to a compression and decompression method capable of dividing information for compression and decompressing the divided information in parallel.

High-definition image data and high-frame rate image data increases bandwidth used to extract the data. As bandwidth increases, the processing of a device, such as a mobile phone or computer, may reach a limit set by the hardware in the device. As a result, speed of the image data may decrease to an undesirable level (e.g., in some cases, where the image data is delayed or unviewable).

In some examples, a technique such as variable bit rate (VBR) may be used. However, in some examples, when using VBR methods, the compression data stream (e.g., the size information on the compression data stream) may fluctuate depending on the compressed data, resulting in poor image quality. In some cases, data may be compressed before the data is written to a memory. Then, the compressed data may be decompressed before data is read from the memory.

Accordingly, in some embodiments, the present disclosure generates multiple divided data streams by dividing a compression data stream into divided compression data streams each including a same number of bits (e.g., into different divided compression data streams each including some number of predetermined bits) in a VBR manner. The system then processes the divided data streams in parallel to extract the data and decompresses the entire divided compression data stream based on the extracted data.

Embodiments of the present disclosure include an image processing device. The image processing device includes a multimedia processor and a frame buffer compressor.

The multimedia processor processes raw data of an image frame to generate image data for one or more pixels of the image frame. For instance, the image data of a pixel may be compressed using a VBR mode to generate a compression data stream, where the compression data stream may then be divided into a predetermined number of bits (e.g., where each divided compression data stream each includes the predetermined number of bits).

The frame buffer compressor of the image processing device may include a decoder that decompresses the compression data stream to generate output data. For example, the decoder may include a first predecoder, a second predecoder, and a merger. The first predecoder generates a first data stream (e.g., based on a first divided compression data stream) and the second predecoder generates a second data stream different from the first data stream (e.g., based on a second divided compression data stream). The decoder then outputs first divided data based on the first data stream and outputs second divided data based on the second compression data stream. The merger receives the first divided data and the second divided data, and the merger decompresses (e.g., performs a decompression operation on) the compression data stream based on the first divided data and the second divided data.

Hereinafter, embodiments according to the technical idea of the present disclosure will be described referring to the accompanying drawings. In the description of FIGS. 1 to 19, the same reference numerals are used for substantially the same components, and repeated description of the components will not be provided. Also, similar reference numerals are used for similar components throughout various drawings of the present disclosure.

FIGS. 1 to 4 are block diagrams for explaining an image processing device according to some embodiments of the present disclosure.

Referring to FIG. 1, the image processing device according to some embodiments of the present disclosure includes a multimedia processor 100, a frame buffer compressor (FBC) 200, a memory 300, and a system bus 400.

The multimedia processor 100 may be a part that directly performs the image processing of the image processing device. For example, the multimedia processor 100 may include or refer to various modules for performing the record and playback of one or more images, such as camcoding and playback of video images.

In some examples, the multimedia processor 100 may receive first data (e.g., from outside the device, such as from a camera) and convert the first data into second data. The first data may be a moving image or image raw data of an image frame. The second data is data generated by the multimedia processor 100, and may also include data being processed by the multimedia processor 100. For example, the multimedia processor 100 may repeat the process of storing the second data in the memory 300 and updating the second data again. The second data may include the data in these steps. However, since the second data may be stored in the form of a third data when stored in the memory 300, the second data may mean data before being stored in the memory 300 or after being read from memory 300. This will be explained in more detail below.

The multimedia processor 100 may include an image signal processor (ISP) 110, an image stabilization module (ISM) 120, a multi-format codec MFC 130, a graphics processing unit (GPU) 140, and a display 150. However, embodiments are not limited thereto. For example, the multimedia processor 100 may include at least some of the image signal processor 110, the image stabilization module 120, the multi-format codec 130, the GPU 140, and the display 150 that are described above. For example, the multimedia processor 100 may use a processing module that may access the memory 300 to process the moving images or images.

A processor may be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. In some cases, the processor may be configured to execute computer-readable instructions stored in a memory to perform various functions. In some embodiments, a processor may include special purpose components for modem processing, baseband processing, digital signal processing, or transmission processing.

The image signal processor 110 may receive the first data, preprocess the first data, and convert the first data into the second data. In some examples, the first data may be red green blue (RGB) type image source data. For example, the image signal processor 110 may convert the RGB type first data into the YUV type second data (e.g., YUV color space type second data).

In some examples, the RGB type data refers to a data format in which colors are expressed based on the three primary colors of light. For example, the RGB type data is a type of expressing an image using three kinds of colors such as red, green, and blue. In contrast, the YUV type refers to a data format that separates and expresses brightness, for example, a luminance signal and a chrominance signal. For example, Y refers to a luminance signal, and each of U(Cb) and V(Cr) refers to color difference signals. U refers to a difference between the luminance signal and the blue signal component, and V refers to a difference between the luminance signal and the red signal component.

The YUV type data may be obtained by being converted from the RGB type data, using conversion formulas such as Y=0.3R+0.59G+0.11B, U=(B−Y)×0.493, V=(R−Y)×0.877. The conversion formulas are shown as an example. In other examples, other formulas may be used.

Because the human eye is sensitive to luminance signals, but the human eye is less sensitive to color signals, the YUV type data may be more easily compressed compared to RGB type data. As a result, the image signal processor 110 may convert the RGB type first data into the YUV type second data.

The image signal processor 110 may convert the first data into the second data and then store the second data in the memory 300.

The image stabilization module 120 may perform image stabilization of image and moving image data (e.g., video data). The image stabilization module 120 may read the first data or the second data stored in the memory 300 to perform the image stabilization. In some examples, image stabilization refers to the detection of the shaking of the camera from the moving image data (e.g., video data), as well as the correction (e.g., removal) of the detected shaking. In some cases, the image stabilization module 120 may correct the shaking of the first data or the second data, generate or update new second data, and store the second data in the memory 300.

The multi-format codec 130 may be a codec that compresses moving image data. In general, since the moving image data is large in size, a compression module may be used to reduce the size of the moving image data. The moving image data is compressible through associations between the plurality of frames, and this may be performed by the multi-format codec 130. The multi-format codec 130 may read and compress the first data or the second data stored in the memory 300.

The multi-format codec 130 may compress the first data or the second data to generate new second data or update the second data, and store this in the memory 300.

The GPU 140 may calculate and generate 2D or 3D graphics. The GPU 140 may perform arithmetic processing on the first data or the second data stored in the memory 300. The GPU 140 is specialized in processing graphics data and may process graphics data in parallel. The GPU 140 may compress the first data or the second data to generate new second data or update the second data, and store this in the memory 300.

Examples of a memory 300 include random access memory (RAM), read-only memory (ROM), or a hard disk. Examples of memory 300 include solid state memory and a hard disk drive. In some examples, memory 300 is used to store computer-readable, computer-executable software including instructions that, when executed, cause a processor to perform various functions described herein. In some cases, the memory 300 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The display 150 may display the second data stored in the memory 300 on a screen. The display 150 may display an image data processed by another multimedia processor 100, for example, the image signal processor 110, the image stabilization module 120, the multi-format codec 130 and the GPU 140, for example, the second data on the screen. However, the embodiment is not limited thereto.

A display 150 may comprise a conventional monitor, a monitor coupled with an integrated display, an integrated display (e.g., an LCD display), or other means for viewing associated data or processing information. Output devices other than the display 150 can be used, such as printers, other computers or data storage devices, and computer networks.

The image signal processor 110, the image stabilization module 120, the multi-format codec 130, the GPU 140 and the display 150 of the multimedia processor 100 may each operate individually. For example, each of the image signal processor 110, the image stabilization module 120, the multi-format codec 130, the GPU 140 and the display 150 may individually access the memory 300 to write or read the data.

The frame buffer compressor 200 compresses the second data and converts the second data into the third data before the multimedia processor 100 individually accesses the memory 300. The frame buffer compressor 200 may retransmit the third data to the multimedia processor 100 again, and the multimedia processor 100 may transmit the third data to the memory 300.

As a result, the third data compressed by the frame buffer compressor 200 may be stored in the memory 300. Conversely, the third data stored in the memory 300 may be loaded by the multimedia processor 100 and transmitted to the frame buffer compressor 200. The frame buffer compressor 200 may decompress the third data and convert the third data into the second data. The frame buffer compressor 200 may transmit the second data to the multimedia processor 100 again.

For example, each time the image signal processor 110, the image stabilization module 120, the multi-format codec 130, the GPU 140 and the display 150 of the multimedia processor 100 individually access the memory 300, the frame buffer compressor 200 may compress the second data into the third data and transfer the third data to the memory 300. Conversely, each time there are data requests from the memory 300 to the image signal processor 110, the image stabilization module 120, the multi-format codec 130, the GPU 140, and the display 150 of the multimedia processor 100, the frame buffer compressor 200 may decompress the third data into the second data, and transmit the second data to each of the image signal processor 110, the image stabilization module 120, the multi-format codec 130, the GPU 140 and the display 150 of the multimedia processor 100.

The memory 300 may store the third data generated by the frame buffer compressor 200, and provide the stored third data to the frame buffer compressor 200 so that the frame buffer compressor 200 may decompress the third data.

The multimedia processor 100 and the memory 300 may each be connected to the system bus 400. The image signal processor 110, the image stabilization module 120, the multi-format codec 130, the GPU 140, and the display 150 of the multimedia processor 100 may be individually connected to the system bus 400. The system bus 400 may become a route through which the image signal processor 110, the image stabilization module 120, the multi-format codec 130, the GPU 140, the display 150, and the memory 300 of the multimedia processor 100 transmit data to each other.

The frame buffer compressor 200 may not be connected to the system bus 400, and frame buffer compressor 200 may convert the second data into the third data and convert the third data into the second data, when each of the image signal processor 110, the image stabilization module 120, the multi-format codec 130, the GPU 140, and the display 150 of the multimedia processor 100 accesses the memory.

Figure 2:
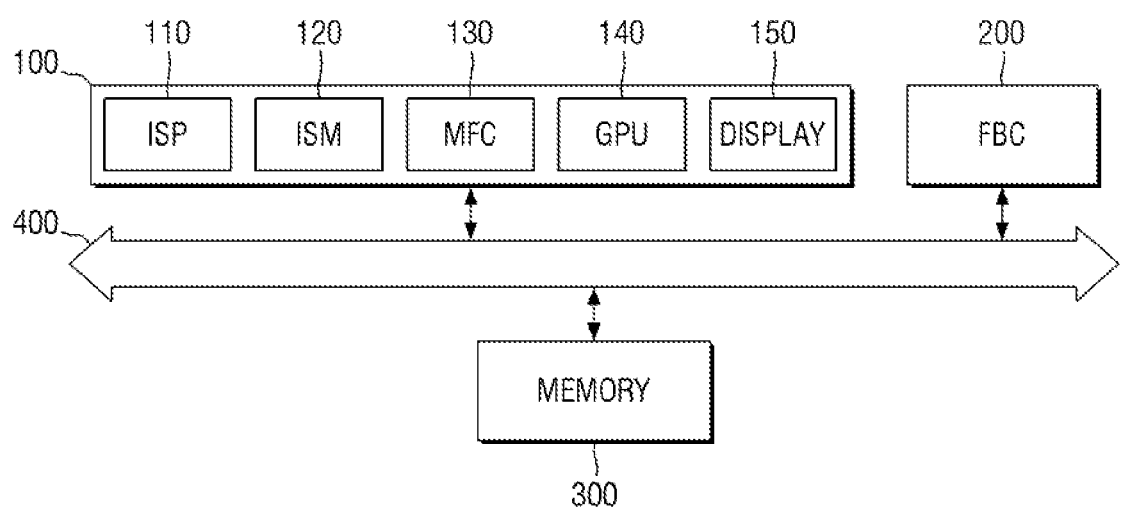

Next, referring to FIG. 2, the frame buffer compressor 200 of the image processing device, according to some embodiments of the present disclosure, may be directly connected to the system bus 400.

The frame buffer compressor 200 is not directly connected to the multimedia processor 100, but may be connected through the system bus 400. Each of the image signal processor 110, the image stabilization module 120, the multi-format codec 130, the GPU 140 and the display 150 of the multimedia processor 100 transmits the data to and from the frame buffer compressor 200 through the system bus 400, and may transmit the data to the memory 300 accordingly.

For example, in the process of compression, the image signal processor 110, the image stabilization module 120, the multi-format codec 130, the GPU 140 and the display 150 of the multimedia processor 100 may each transmit the second data to the frame buffer compressor 200 through the system bus 400. Subsequently, the frame buffer compressor 200 may compress the second data into the third data and transmit this to the memory 300 through the system bus 400 again.

Similarly, during decompression, the frame buffer compressor 200 receives the third data stored in the memory 300 through the system bus 400, and may decompress the third data into the second data. Subsequently, the frame buffer compressor 200 may transmit the second data to each of the image signal processor 110, the image stabilization module 120, the multi-format codec 130, the GPU 140 and the display 150 of the multimedia processor 100 through the system bus 400.

In some examples, a device may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

Figure 3:
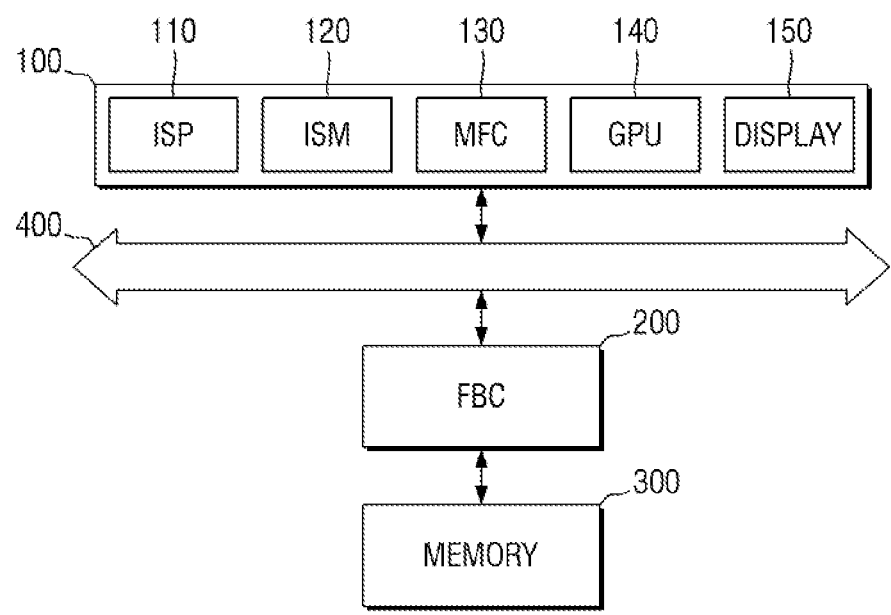

Next, referring to FIG. 3, in the image processing device according to some embodiments of the present disclosure, the memory 300 and the system bus 400 may be connected to each other through the frame buffer compressor 200.

In an example scenario, the memory 300 is not directly connected to the system bus 400, but may be connected to the system bus 400 through the frame buffer compressor 200. Additionally or alternatively, the image signal processor 110, the image stabilization module 120, the multi-format codec 130, the GPU 140 and the display 150 of the multimedia processor 100 may be directly connected to the system bus 400. Therefore, the image signal processor 110, the image stabilization module 120, the multi-format codec 130, the GPU 140 and the display 150 of the multimedia processor 100 may access the memory 300 by going through the frame buffer compressor 200.

Figure 4:
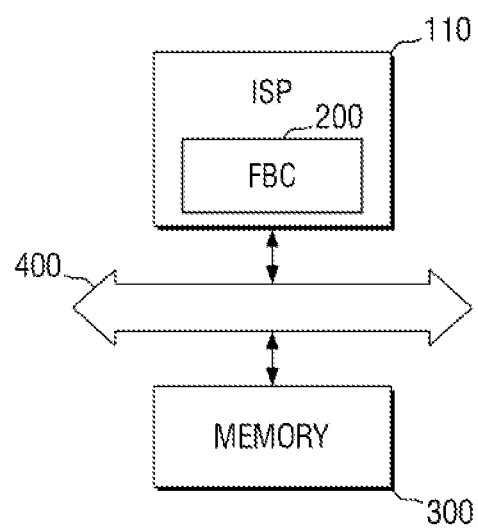

Next, referring to FIG. 4, according to the embodiment, the image signal processor 110 individually includes the frame buffer compressor 200, and may send and receive the third data to and from the memory 300 through the system bus 400.

Although not shown in the drawings, the embodiment of FIG. 4 may also be applied to the image stabilization module 120, the multi-format codec 130, the GPU 140 and the display 150 as well as the image signal processor 110. In the present disclosure, the second data is also referred to as image data 10, and the third data is also referred to as compressed data 20.

Figure 5:
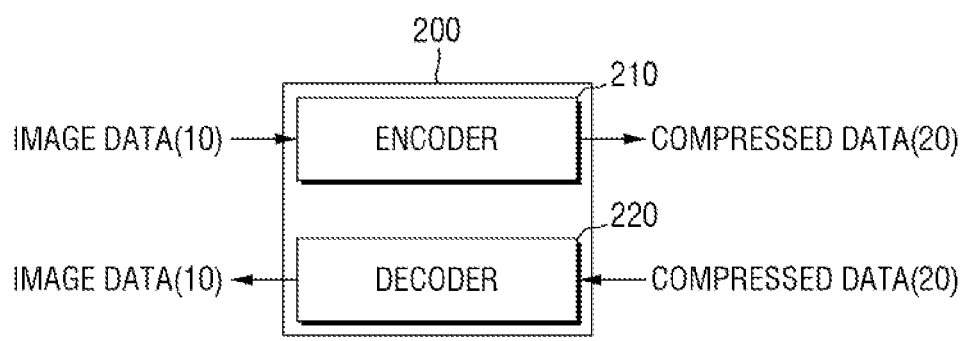
FIG. 5 is a block diagram for explaining a frame buffer compressor of FIGS. 1 to 4 in detail.

FIG. 5 is a block diagram for explaining the frame buffer compressors of FIGS. 1 to 4 in detail. Referring to FIG. 5, the frame buffer compressor 200 may include an encoder 210 and a decoder 220.

The encoder 210 may receive the image data 10 from the multimedia processor 100 and generate the compressed data 20. In some examples, the image data 10 may be transmitted from each of the image signal processor 110, the image stabilization module 120, the multi-format codec 130, the GPU 140 and the display 150 of the multimedia processor 100. The compressed data 20 may be transmitted to the memory 300 through the multimedia processor 100 and the system bus 400.

Additionally, or alternatively, the decoder 220 may decompress the compressed data 20 stored in the memory 300 into the image data 10. The image data 10 may be transferred to the multimedia processor. In some examples, the image data 10 may be transferred to each of the image signal processor 110, the image stabilization module 120, the multi-format codec 130, the GPU 140 and the display 150 of the multimedia processor 100.

Figure 6:
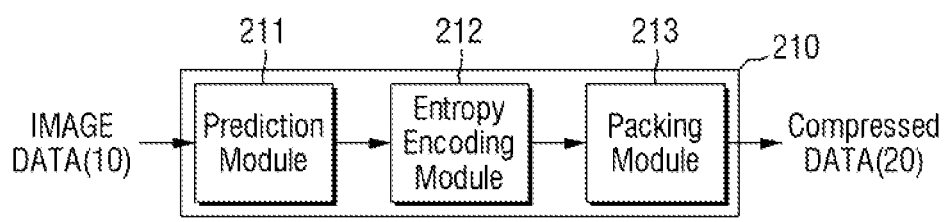
FIG. 6 is a block diagram for explaining an encoder of FIG. 5 in detail.

FIG. 6 is a block diagram for explaining the encoder of FIG. 5 in detail. Referring to FIG. 6, the encoder 210 includes a prediction module 211, an entropy coding module 212, and a packing module 213. The encoder 210 may receive image data 10 indicating one image frame, and according to the embodiment, the image data 10 may be provided to the encoder 210 in pixel units or block units constituting the image frame.

In digital imaging, a pixel (or picture element) may refer to the smallest addressable element in a display device, and the smallest controllable element of a picture represented on the device. In some cases, each pixel may represent a sample of an original image. The color and intensity of each pixel may be variable. In color imaging systems, a color may be represented by three or four component intensities such as red, green, and blue, or cyan, magenta, yellow, and black.

The prediction module 211 may convert the image data 10 into a residual data. The residual data may be expressed separately into data of the reference pixel and the residual of the pixel adjacent to the reference pixel. For example, when one pixel has a value of 0 to 255, 8 bits of data per pixel may be used to express one pixel with a value of 0 to 255. On the other hand, when adjacent pixels have similar values, there is no data loss even if the difference from the adjacent pixels, for example, the residual is expressed, and the number of data bits for expressing may be significantly reduced. For example, when the pixel in which the reference pixel and the adjacent pixels P1 and P2 have values of 96, 97, and 98 is continued, if data of the reference pixel is set to 96, expression of residual data of (96 (reference), 1 (residual), and 1 (residual) is sufficient, and the number of bits per pixel for expressing such residual data may become very smaller to 2 bits.

Therefore, the prediction module 211 may dividedly express the residual data into the data of the reference pixel and the residual of the adjacent pixel to compress the overall size of the image data 10. Additionally or alternatively, although residual data may be generated based on the image data 10 to be input to the prediction module 211 and the prediction data generated from the prediction module 211, various methods are possible as the method for generating the prediction data, depending on the embodiment.

The prediction module 211 may perform predictions on a pixel basis or on a block basis. In some examples, the block may mean a region formed by a plurality of adjacent pixels.

The entropy coding module 212 may compress the residual data generated by the prediction module 211 through entropy coding. In some examples, the entropy coding may utilize a method for allocating the number of bits depending on the frequency.

In some aspects, entropy coding may include or refer to a form of lossless (e.g., or a form of reduced loss) data compression. Lossless compression aims to represent discrete data with fewer bits than needed for the original data representation (e.g., without any loss of information, which may improve the effectiveness of decompression techniques).

The entropy encoding module 212 may encode and compress some or all of the image data 10 of one pixel at a VBR. The entropy encoding module 212 outputs the number of bits that are variable for each pixel. The entropy coding module 212 may perform encoding by Golomb-Rice coding, exponential Golomb coding or Huffman coding mode. In particular, the image data 10 may be compressed by the Golomb-Rice coding mode. In some examples, the entropy coding module 212 may generate an entropy table through a K-value, and may easily compress the image data 10.

An entropy table refers to a plurality of code tables identified through the K-value to perform an entropy coding algorithm, and the entropy table that may be used in some embodiments of the present disclosure may include at least one of Golomb-Rice code and exponential Golomb code. Golomb codes are a set of entropy codes designed for geometrical distributed source. In some examples, if the order of the Golomb code is zero, the Golomb code may be referred to as unary code.

Although not shown, when the encoder 210 operates in a lossy mode according to the embodiment, the quantization module may operate prior to the entropy coding module 212. The lossy mode may have a relatively high compression rate compared to a lossless mode in which the quantization module does not operate, may have a preset fixed compression rate, and therefore may not separately require information on the compression rate later. However, since a removal operation may be performed on some bits of the image data 10 in the quantization module, some bits may not be restored and may be lost later.

The packing module 213 may perform padding on the image data 10 compressed by the entropy encoding module 212, pack the data that may be output from the encoder 210, and output the data as the compressed data 20 in the form of data stream. Here, the padding may mean an addition of meaningless data to fit the specific size.

After that, the frame buffer compressor 200 may write the generated compressed data 20 to the memory 300. Further, the frame buffer compressor 200 may read the compressed data 20 from the memory 300, decompress the read compressed data 20, and provide read compressed data 20 to the multimedia processor 100.

Figure 7:
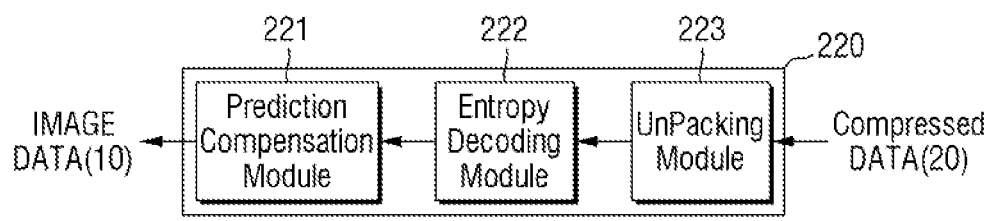
FIG. 7 is a block diagram for explaining a decoder of FIG. 5 in detail.
Figure 8:
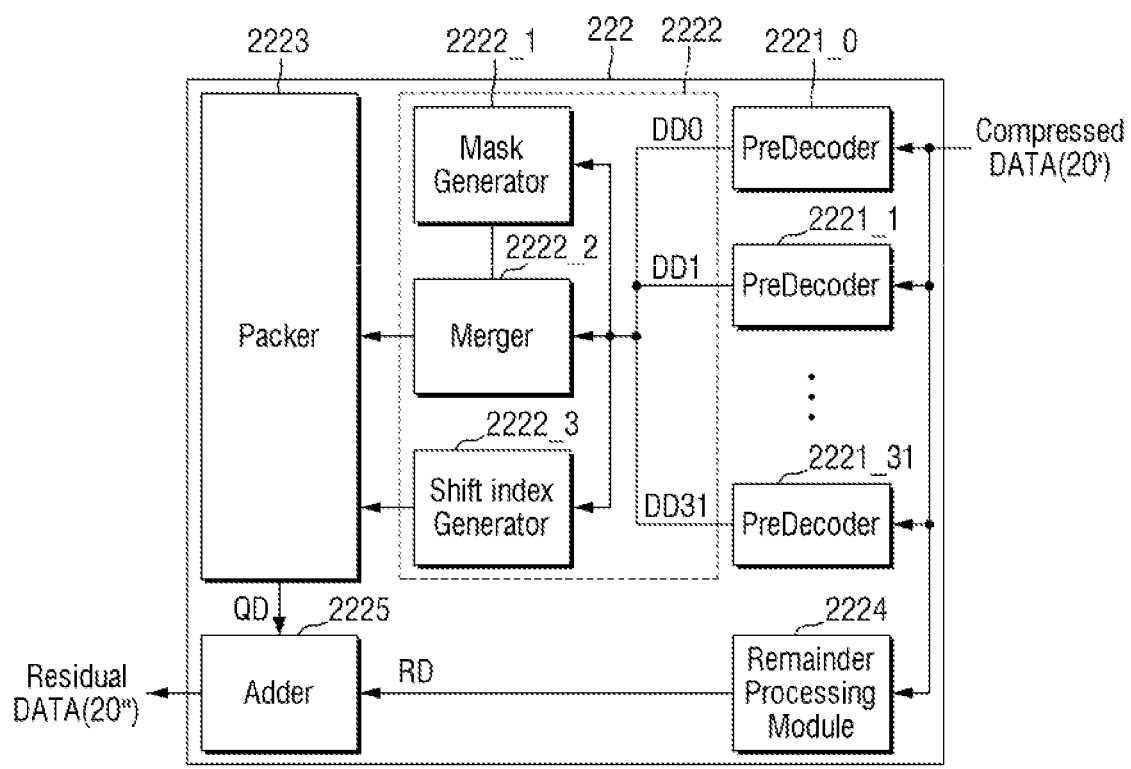
FIG. 8 is a block diagram for explaining an entropy decoding module of FIG. 7 in detail.

FIG. 7 is a block diagram for explaining the decoder of FIG. 5 in detail. FIG. 8 is a block diagram for explaining the entropy decoding module of FIG. 7 in detail.

Referring to FIGS. 7 and 8, the decoder 220 includes an unpacking module 223, an entropy decoding module 222, and a prediction compensation module 221.

The unpacking module 223 may remove a padded portion of the data padded by the packing module 213 of the encoder 210. After that, the data stream may be divided and the divided data stream may be provided to other configurations inside the decoder 220.

The entropy decoding module 222 may receive compressed data 20' in the form of a data stream from which the padded portion is removed. The form of the data stream will be described later in the description of FIGS. 9 to 12.

The entropy decoding module 222 may decompress the compressed data 20' through Golomb-Rice coding, exponential Golomb coding or Huffman coding mode. For ease of explanation, in the explanation of the present disclosure, the entropy decoding module 222 may be assumed to decompress the compressed data 20' by the Golomb-Rice coding mode. Since the compressed data 20' includes the K-value, the entropy decoding module 222 may perform decoding, using the K-value.

The entropy decoding module 222 may include a plurality of predecoders 2221_0 to 2221_31, an integration module 2222, a packer 2223, remainder processing module 2224, and an adder 2225.

Figure 14:
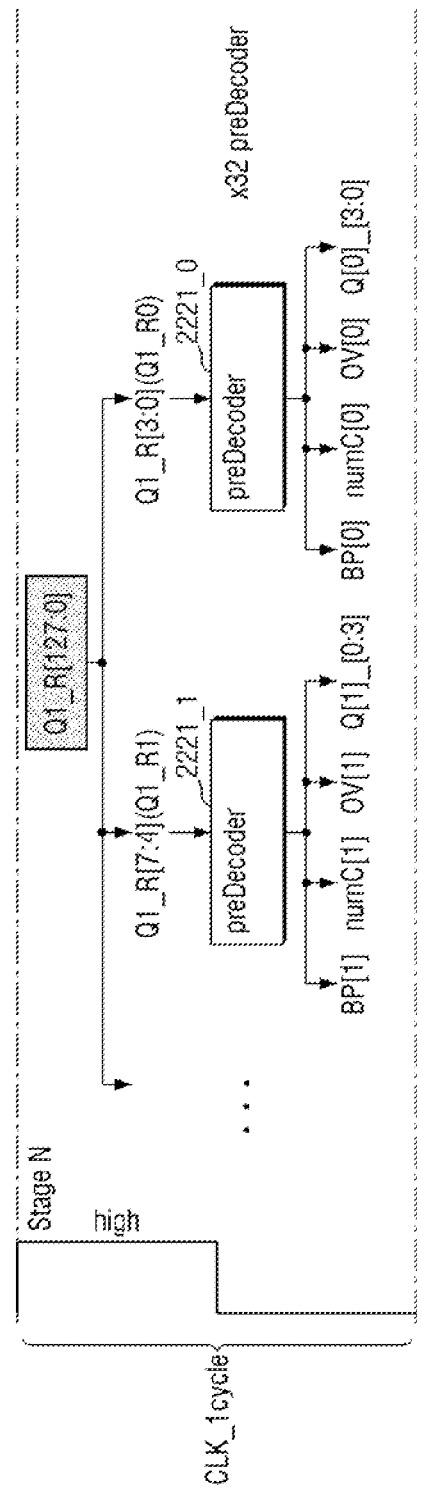

Each of the predecoders 2221_0 to 2221_31 may receive first and second quotient regions (Q1_R and Q2_R, see FIG. 12) of the compressed data 20' of the data stream type, and divide the compressed data 20' into a predetermined number of bits (for example, 4 bits) to each generate divided compression data stream (Q1_R0, see FIG. 14). Each of the predecoders 2221_0 to 2221_31 may generate a plurality of divided data DD0 to DD31 based on each divided compression data stream. A specific operation description of the predecoders 2221_0 to 2221_31 will be provided below in the description of FIGS. 14 and 15.

The number and arrangement of predecoders 2221_0 to 2221_31 of FIG. 8 are examples, and the technical ideas of the present disclosure are not limited thereto. The number of predecoders 2221_0 to 2221_31 and the like may be affected by the size of each block (B, see FIG. 9) to be decoded. In the present disclosure, for convenience of explanation, the entropy decoding module 222 may be assumed to include thirty-two $0^{th}$ to thirty-first predecoders 2221_0 to 2221_31.

The integration module 2222 may include a mask generator 2222_1, a merger 2222_2, and a shift index generator 2222_3. The mask generator 2222_1 may receive a plurality of divided data DD0 to DD31 and transfer the state information of the divided data DD0 to DD31. The merger 2222_2 may generate quotient data of the compressed data 20' compressed by Golomb-Rice coding through the plurality of divided data DD0 to DD31 and state information received from the mask generator 2222_1 to perform decompression operation, and may transfer the generated quotient data to the packer 2223. The shift index generator 2222_3 may output the arrangement information of the quotient data transferred to the packer 2223 and transfer the arrangement information of the quotient data to the packer 2223.

The packer 2223 may generate a plurality of quotients QD of compressed data 20' based on the provided quotient data and the arrangement information of the quotient data. Specific operation explanations of the integration module 2222 and the packer 2223 will be described below in the explanation of FIGS. 17 and 18. The mask generator 2222_1, the merger 2222_2 and the shift index generator 2222_3 included inside the integration module 2222 may operate in the same clock cycle.

The remainder processing module 2224 receives the first and second residual regions (R1_R, R2_R, see FIG. 12) of the compressed data 20', generates the plurality of residual RD of K bit based on the K-value, and may transfer the plurality of residual RD of K bit to the adder 2225.

The adder 2225 may receive each of the plurality of quotients QD and the plurality of residuals RD, and perform the adding operation based on the plurality of quotients QD and the plurality of residuals RD to generate the residual data 20". For example, the decompressed data may be output.

Although not shown, when the encoder 210 operates in a lossy mode depending on the embodiment, the decoder 220 may include an inverse quantization module that operates after the operation of the entropy decoding module 222. Although the compressed data 20 compressed may be restored using the quantization coefficient defined by the quantization module of the encoder 210, even the part lost in the compression process may not be restored.

The prediction compensation module 221 may restore the data expressed as residual data by the prediction module 211. The prediction compensation module 221 may, for example, convert the residual data expression of (96 (Base), 1 (residual), 1 and (residual)) into 96, 97, and 98.

The prediction compensation module 221 may restore predictions performed on a pixel basis or a block basis according to the prediction module 211. As a result, the compressed data 20 may be restored or decompressed and transmitted to the multimedia processor 100.

FIGS. 9 to 12 are diagrams for explaining a compression data stream compressed by the image processing device according to some embodiments of the present disclosure.

Figure 9:
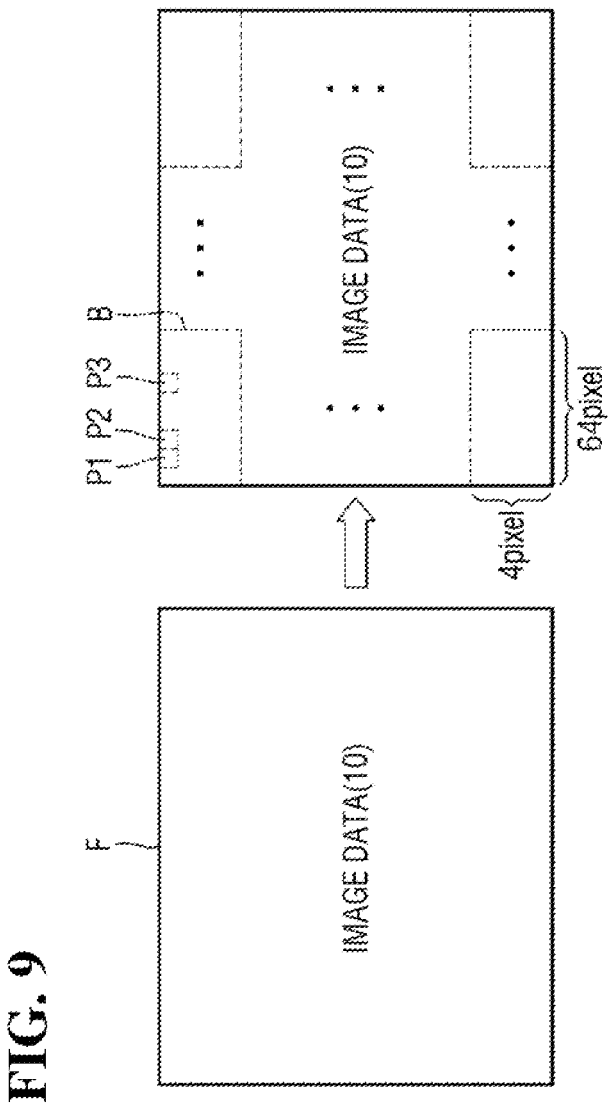
FIGS. 9 to 12 are diagrams for explaining a compression data stream compressed in the image processing device according to some embodiments of the present disclosure.

FIG. 9 is a diagram for explaining the image data 10 for example input to the encoder 210. Referring to FIG. 9, the image data 10 may include data of one image frame F. The image data 10 may include image data of a plurality of blocks B.

The size of each block B may have various examples, including 64×4, 16×4 or 4×4 pixels, and for convenience of explanation, the image data of block B of the present disclosure may include image data of 64×4 pixels. Any block B may include first to third pixels P1 to P3. Depending on the embodiments, the first and second pixels P1 and P2 may be placed adjacent to each other.

Although the data bit for each pixel may differ depending on the embodiment, for convenience of explanation, the image data 10 of the pixels uses 8 bits.

The encoder 210 may perform encoding in units of blocks B to perform a compression operation, and the decoder 220 may also perform decoding in units of image data of a plurality of blocks B to perform a decompression operation.

Figure 10:
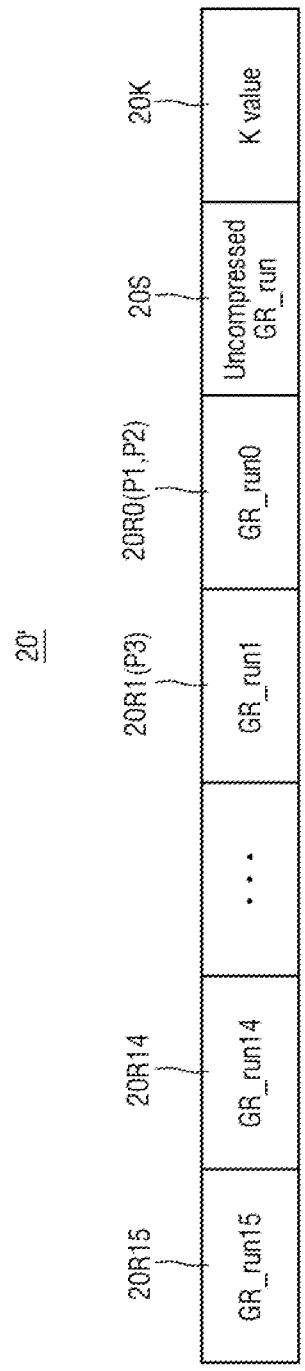
Figure 11:
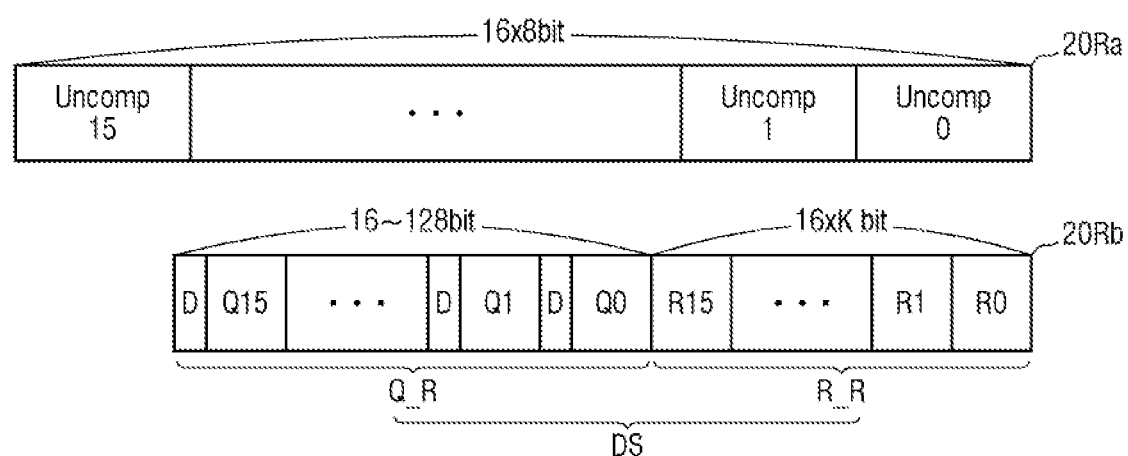

Referring to FIGS. 10 to 11, the compressed data 20' has the form of a data stream, is a Golomb-Rice code generated when the entropy encoding module 212 encodes the residual data converted by the prediction module 211 by the Golomb-Rice mode, and is Golomb-Rice code decoded by the entropy decoding module 222.

The compressed data 20' may include K-value data 20K, uncompressed Golomb-run data 20S, and $0^{th}$ to fifteenth Golomb-runs 20R0 to 20R15.

The K-value data 20K may include K-value information of the Golomb-Rice coding of the compressed data 20', may include L K-values depending on the embodiment, and the K-value data 20K may use K×L bits.

The uncompressed Golomb-run data 20S may indicate the state information of the uncompressed Golomb-run of the $0^{th}$ to fifteenth Golomb-runs 20R1 to 20R15. Therefore, the uncompressed Golomb-run data 20S may use 16 bits.

Each of the Golomb-runs 20R0 to 20R15 may include data on residual data of 4×4 pixel. The $0^{th}$ Golomb-run 20R0 may include the data of the first and second pixels P1 and P2 of FIG. 9, and the first Golomb-run 20R1 adjacent to the $0^{th}$ Golomb-run 20R0 may include data of third pixel P3 of FIG. 9.

Since each of the Golomb-runs 20R0 to 20R15 indicates the data of Golomb-Rice code which is a variable bit rate type, residual data uses 8 bits, and when encoding is performed on 4×4 pixels corresponding to one Golomb-run by the Golomb-Rice coding mode, the Golomb-runs 20R0 to 20R15 may use the number of bits more than 8×16 bits which are the data before compression. Therefore, the compression operation may not be performed on the uncompressed Golomb-run 20Rb among the Golomb-runs 20R0 to 20R15.

Assuming that the entropy encoding module 212 does not perform the compression operation on the uncompressed Golomb-run 20Rb and performs the compression operation on the compressed Golomb-run 20Ra among the Golomb-runs 20R0 to 20R15, the uncompressed Golomb-run 20Rb includes the $0^{th}$ to fifteenth uncompressed data Uncomp0 to Uncomp15, and the uncompressed Golomb-run 20Rb may use 128 bits.

The compressed Golomb-run 20Ra may include $0^{th}$ to fifteenth quotient data Q0 to Q15, the separator data D, and the $0^{th}$ to fifteenth residual data R0 to R15. The $0^{th}$ to fifteenth quotient data Q0 to Q15, and the separator data D uses 16 bits to 80 bits, and the $0^{th}$ to fifteenth residual data R0 to R15 may include 16×Kbits. The pair of quotient data and residual data may correspond to the image data of one of the pixels corresponding to the Golomb-run 20Ra.

Figure 12:
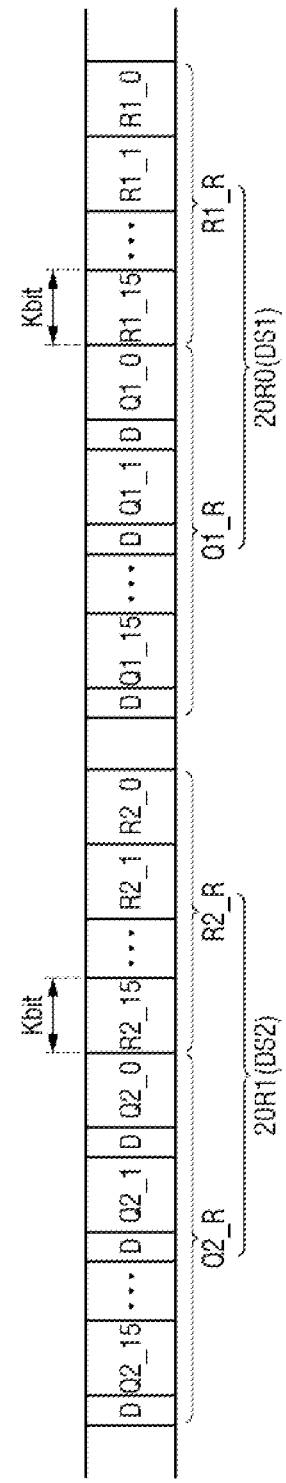

Referring to FIG. 12, the compressed data 20a may include a first compression data stream DS1 and a second compression data stream DS2. The first compression data stream DS1 and the second compression data stream DS2 have the data form of compressed Golomb-run 20Ra, the first compression data stream DS1 corresponds to the $0^{th}$ Golomb-run 20R0, and the second compression data stream DS2 corresponds to the first Golomb-run 20R1. Therefore, the first compression data stream DS1 may include the compressed data of the first and second pixels P1 and P2 of FIG. 9, and the second compression data stream DS2 may include compressed data of the third pixel P3 of FIG. 9.

The first compression data stream DS1 may include a first quotient region Q1_R and a first residual region R1_R. The first quotient region Q1_R may include first_0 to first_15 quotient data Q1_0 to Q1_15 and the separator data D. At least a part of the first_0 to first_15 quotient data Q1_0 to Q1_15 may correspond to the quotient data of the compressed data of the first and second pixels P1 and P2. The first residual region R1_R may include the first_0 to first_15 residual data R1_0 to R1_15. Each of the first_0 to first_15 residual data R1_0 to R1_15 steadily uses K bit. At least a part of the first_0 to first_15 residual data R1_0 to R1_15 may correspond to the residual data of the compressed data of the first and second pixels P1 and P2.

The encoder 210 may output the first residual regions R1_R prior to the first quotient region Q1_R, and the decoder 220 may receive the first residual region R1_R prior to the first quotient region Q1_R.

The second compression data stream DS2 may include a second quotient region Q2_R and a second residual region R2_R. The second quotient region Q2_R may include second_0 to second_15 quotient data Q2_0 to Q2_15 and the separator data D. At least a part of the second_0 to second_15 quotient data Q2_0 to Q2_15 may correspond to the quotient data of the compressed data of the third pixel P3. The second residual region R2_R may include second_0 to second_15 residual data R2_0 to R2_15. Each of the second_0 to second_15 residual data R2_0 to R2_15 steadily uses K bit. At least a part of the second_0 to second_15 residual data R2_0 to R2_15 may correspond to the residual data of the compressed data of the third pixel P3.

The encoder 210 may output the second residual region R2_R of the compressed data 20' prior to the second quotient region Q2_R, and the decoder 220 may receive the second residual region R2_R of the compressed data 20' prior to the second quotient region Q2_R.

Figure 13:
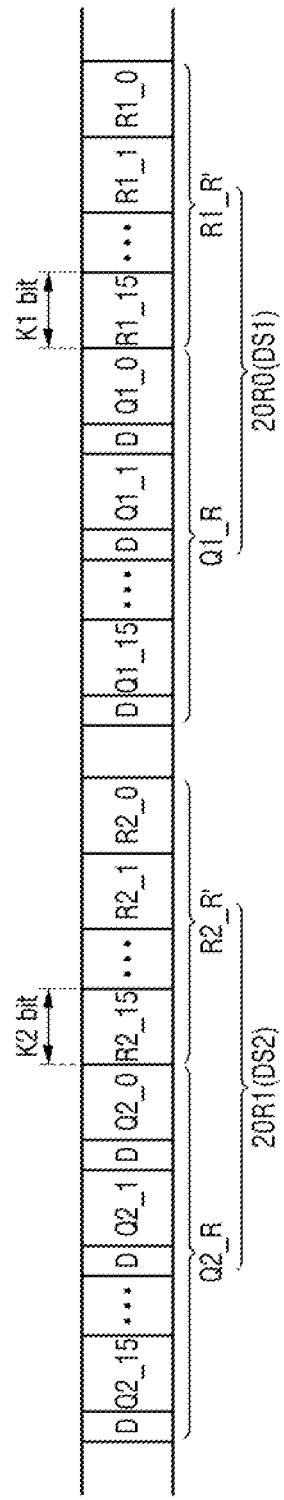
FIG. 13 is a diagram for explaining a compression data stream compressed in an image processing device according to some other embodiments of the present disclosure.

FIG. 13 is a diagram for explaining a compression data stream compressed by the image processing device according to some other embodiment of the present disclosure.

Hereinafter, a compression data stream 20b according to some other embodiments of the present disclosure will be described referring to FIG. 13. Differences from the compression data stream 20a shown in FIG. 12 will be mainly described.

When compared to the first residual region R1_R and the second residual region R2_R of FIG. 12, first_0 to first_15 residual data R1_0 to R1_15 in a first residual region R1_R' of the first compression data stream DS1 steadily uses K1 bit, and second_0 to second_15 residual data R2_0 to R2_15 in a second residual region R2_R' of the second compression data stream DS2 steadily uses K2 bit. Therefore, the K-values of different Golomb-runs in the same block may be different from each other, and the information on K1 and K2 may be included in the K-value data 20K of FIG. 10.

FIGS. 14 to 18 are diagrams for explaining the operation of the image processing device according to some embodiments of the present disclosure.

Figure 15:
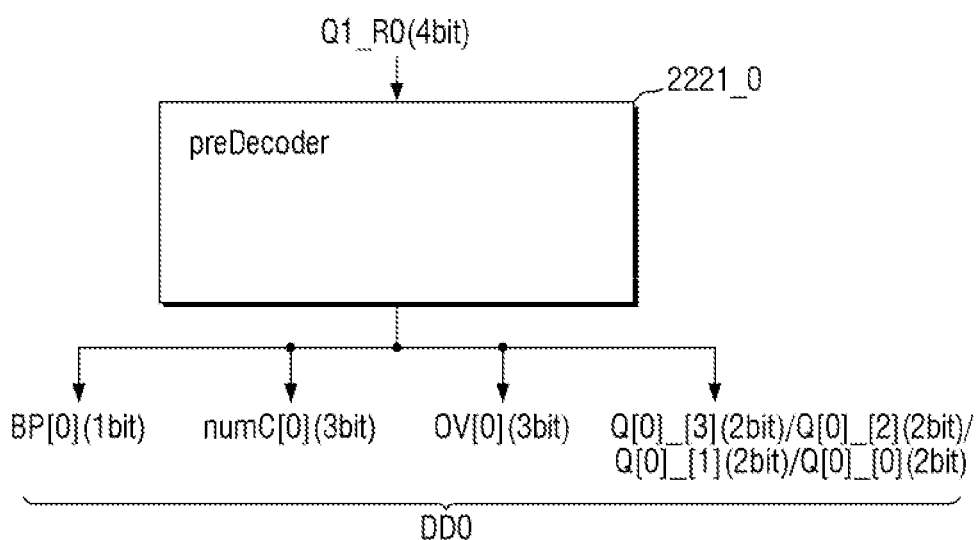

FIGS. 14 to 16 are diagrams for explaining the operation of $0^{th}$ to thirty-first predecoders 2221_0 to 2221_31. Referring to FIGS. 14 to 16, as an example, the $0^{th}$ predecoder 2221_0 may receive the first quotient region Q1_R and maximally receive 128 bits.

At a $N^{th}$ stage (Stage N) which is a section corresponding to one clock cycle CLK_1cyle, the $0^{th}$ predecoder 2221_0 generates a first_0 divided compression data stream Q1_R0 that uses 4 bits, and the first_0 divided compression data stream Q1_R0 corresponds to [3:0] of maximum 128 bits of the first quotient region Q1_R. The $0^{th}$ predecoder 2221_0 outputs the $0^{th}$ divided data DD0 based on the first_0 divided compression data stream Q1_R0.

The fact that the first_0 divided compression data stream Q1_R0 is 4 bits is an example, and the technical idea of the present disclosure is not limited to the aforementioned number of bits. The number of bits of the divided compression data stream may vary, depending on the number and arrangement of the predecoders.

The $0^{th}$ divided data DD0 includes $0^{th}$ bypass data BP[0], $0^{th}$ quotient number data numC[0], $0^{th}$ overflow data OV[0], and $0^{th}$_0 to $0^{th}$_3 preliminary quotient data Q[0]_[3:0].

The $0^{th}$ bypass data BP[0] uses 1 bit, and indicates information in which the separator data (D, described as 1 below) does not exist in the first_0 divided compression data stream Q1_R0. For example, the $0^{th}$ bypass data BP[0] indicates that the $0^{th}$_0 to $0^{th}$-3 preliminary quotient data Q[0]_[3:0] in the first_0 divided compression data stream Q1_R0 are not valid.

The $0^{th}$ quotient number data numC[0] uses 3 bits, and indicates the number of the $0^{th}$_0 to $0^{th}$_3 preliminary quotient data Q[0]_[3:0] that are valid in the first_0 divided compression data stream Q1_R0. For example, in the first_0 divided compression data stream Q1_R0 that may be the same as the number of separator data D in the first_0 divided compression data stream Q1_R0 and is 4 bit, the $0^{th}$ quotient number data numC[0] may be indicated in the range of 0 to 4.

As described herein, a compression data stream may be divided into divided compression data streams (e.g., where each compression data stream includes a predetermined number of bits). Predecoders (e.g., predecoder 2221_0 and predecoder 2221_1) may be used to output divided data streams corresponding to the divided compression data streams. Each divided data stream may include bypass data (BP), quotient number data (numC), overflow data (OV), and preliminary quotient data (Q).

Overflow data of a divided compression data stream may indicate an overflow state of the divided compression data stream. For instance, the overflow data of a divided compression data stream may indicate a value to be transferred to preliminary quotient data of a next divided compression data stream. Preliminary quotient data may include data for determining quotient data of a compression data stream. For example, as described herein, a merger (e.g., a merger of a decoder) forms quotient data for the a compression data stream based on preliminary quotient data for divided compression data streams of the compression data stream. For instance, the quotient number data for each divided compression data stream may indicate which of the preliminary quotient data is valid for the corresponding divided compression data stream. In other words, in some cases, the merger may form quotient data for a compression data stream based on the preliminary quotient data that is valid for each divided compression data stream corresponding to image data of a pixel that is compressed into the compression data stream.

For example, the $0^{th}$ overflow data OV[0] uses 3 bits, indicates the overflow state in the first_0 divided compression data stream Q1_R0, and indicates the value to be transferred to the preliminary quotient data of the first_1 divided compression data stream Q1_R1 or the subsequent divided compression data stream. For example, $0^{th}$ overflow data OV[0] is the same as the number of quotients 0 after the last separator data D in the first_0 divided compression data streams Q1_R0. The $0^{th}$ overflow data OV[0] in the first_0 divided compression data stream Q1_R0 which is 4 bits may be indicated in the range of 0 to 4.

The $0^{th}\_0$ to $0^{th}\_3$ preliminary quotient data Q[0]_[3:0] may include valid data to correspond to the $0^{th}$ quotient number data numC[0]. For example, when the $0^{th}$ quotient number data numC[0] is 2, the $0_{th}\_0$ to $0^{th}\_1$ preliminary quotient data Q[0]_[1:0] are valid, and when the $0^{th}$ quotient number data numC[0] is 4, some or all of the $0^{th}\_0$ to $0^{th}\_3$ preliminary quotient data Q[0]_[3:0] are valid.

The $0^{th}\_0$ to $0^{th}\_3$ preliminary quotient data Q[0]_[3:0] may be indicated in the range of 0 to 3 in the first_0 divided compression data stream Q1_R0 which is 4 bits. Therefore, each of the valid $0^{th}\_0$ to $0^{th}\_3$ preliminary quotient data Q[0]_[3:0] uses 2 bits.

As an example, when the first_0 divided compression data stream Q1_R0 indicates 4'b0000, because there is no separator data (D, 1'b1) in the first_0 divided compression data stream Q1_R0, the $0^{th}$ bypass data BP[0] is 1, the $0^{th}$ quotient number data numC[0] is 0. Therefore, some or all of the $0^{th}\_0$ to $0^{th}\_3$ preliminary quotient data Q[0]_[3:0] are not valid. The $0^{th}$ overflow data OV[0] is 4.

As an example, when the first_0 divided compression data stream Q1_R0 indicates 4'b0110, because the separator data (D, 1'b1) is placed in Q1_R0[1], Q1_R[02] inside the first_0 divided compression data stream Q1_R0, the $0^{th}$ bypass data BP[0] is 0, the $0^{th}$ quotient number data numC[0] is 2. Accordingly, the $0^{th}\_0$ to $0^{th}\_1$ preliminary quotient data Q[0]_[3:0] is valid, the $0^{th}\_0$ preliminary quotient data Q[0]_[0] indicates 1, and the $0^{th}\_1$ preliminary quotient data Q[0]_[1] indicates 0. The $0^{th}$ overflow data OV[0] is 1.

When the first_0 divided compression data stream Q1_R0 indicates 4'b0001 to 4'b1111 other than 4'b0000 and 4'b0110, it is possible to check the values of the $0^{th}$ bypass data BP[0], the $0^{th}$ quotient number data numC[0], the $0^{th}$ overflow data OV[0], and $0^{th}\_0$ to $0^{th}\_3$ preliminary quotient data Q[0]_[3:0].

Similarly, the first predecoder 2221_1 may receive the first quotient region Q1_R and may maximally receive 128 bits.

At the $N^{th}$ stage (Stage N), the first predecoder 2221_1 generates a first_1 divided compression data stream Q1_R1 that uses 4 bits, and the first_1 divided compression data stream Q1_R1 corresponds to [7:4] of maximum 128 bits of the first quotient region Q1_R. The first predecoder 2221_1 outputs the first divided data DD1 based on the first_1 divided compression data stream Q1_R1.

The first divided data DD1 includes the first bypass data BP[1], the first quotient number data numC[1], the first overflow data OV[1], and the first_0 to first_3 preliminary quotient data Q[1]_[3:0].

Each of the first predecoder 2221_1, the first_1 divided compression data stream Q1_R1 and the first divided data DD1 may correspond to each of the $0^{th}$ predecoder 2221_0, the first_0 divided compression data stream Q1_R0, and the $0^{th}$ divided data DD0. The remaining second to thirty-first predecoders 2221_2 to 2221_31, the first_2 to first_31 divided compression data stream Q1_R2 to Q1_R31, and the second to thirty-first divided data DD2 to DD31 may also correspond to each of the $0^{th}$ predecoder 2221_0, the first_0 divided compression data stream Q1_R0, and the $0^{th}$ divided data DD0. Therefore, it is obvious that these explanations are replaced by the explanations of the $0^{th}$ predecoder 2221_0, the first_0 divided compression data stream Q1_R0, and the $0^{th}$ divided data DD0.

Figure 17:
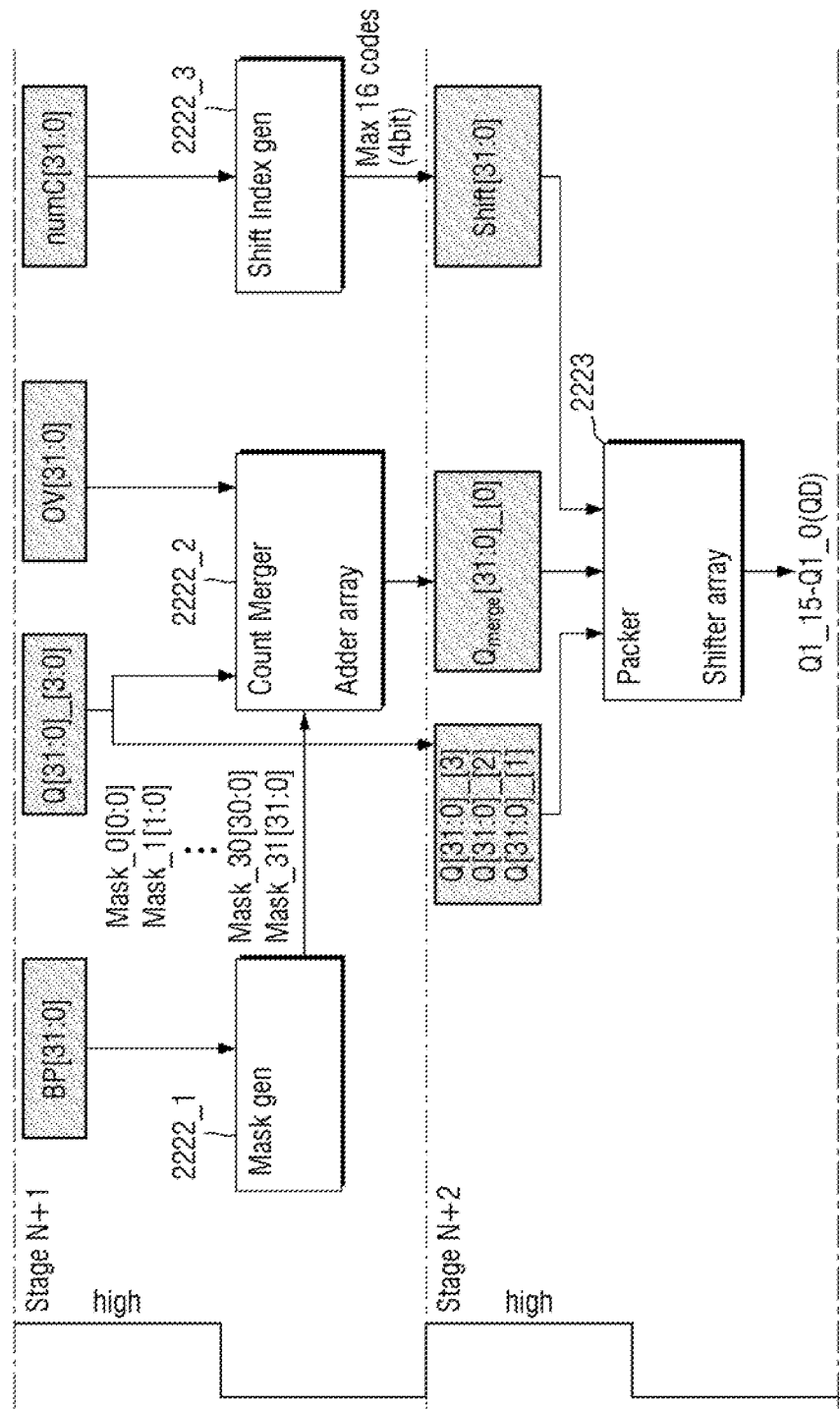
Figure 18:
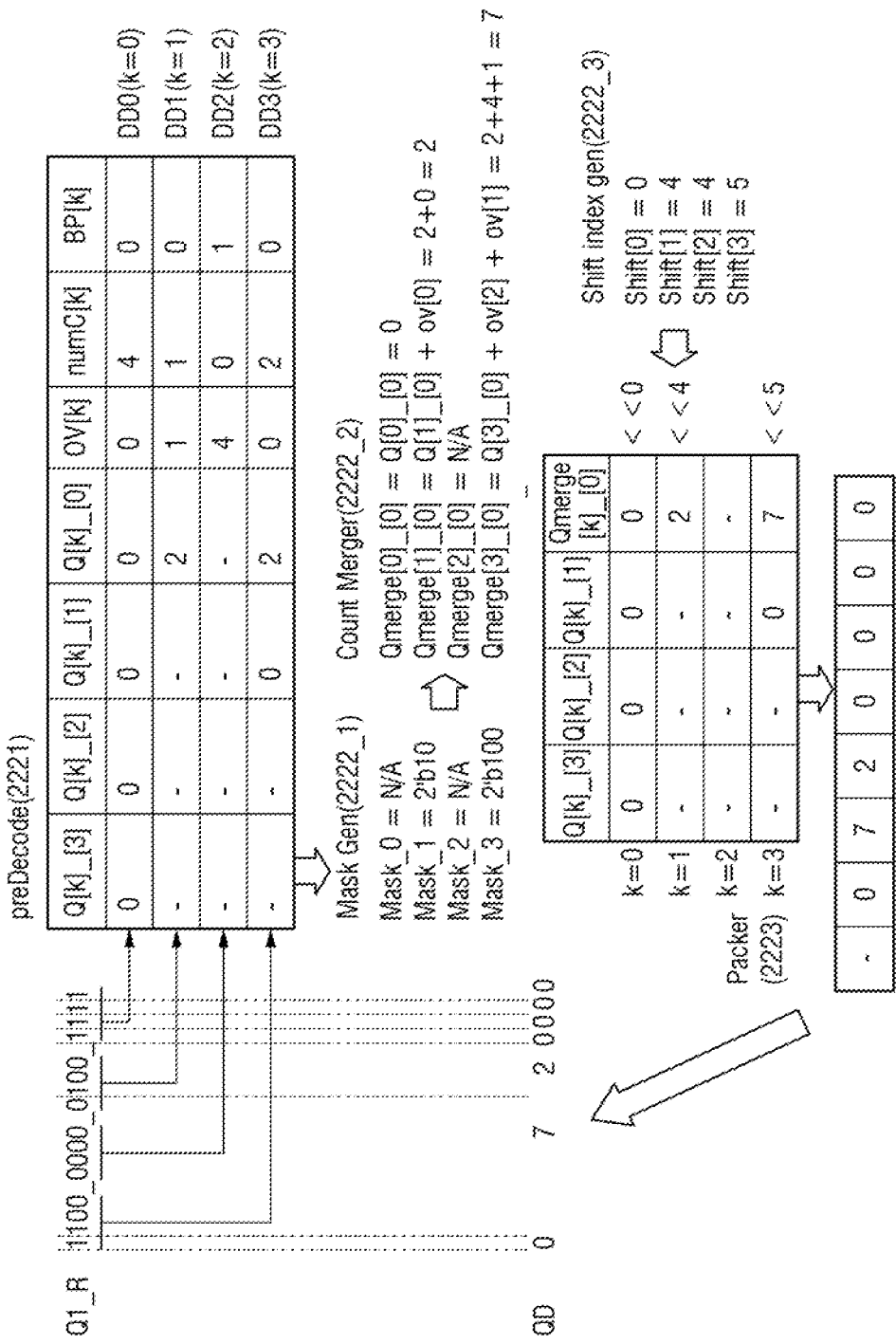

FIGS. 17 to 18 are diagrams for explaining the integration module 2222, and the packer 2223. Referring to FIGS. 17 to 18, at a $N^{th}+1$ stage (Stage N+1) which is the next stage of the $N^{th}$ stage (Stage N), the mask generator 2222_1 receives the $0^{th}$ to thirty-first bypass data BP[31:0] from the $0^{th}$ to thirty-first predecoders 2221_0 to 2221_31.

The mask generator 2222_1 generates the $0^{th}$ to thirty-first masks Mask_0 to Mask_31 based on the $0^{th}$ to thirty-first bypass data BP[31:0] and transfers the masks to the merger 2222_2.

Each of the $0^{th}$ to thirty-first masks Mask_0 to Mask_31 indicates the state of the previous overflow data transfer to the preliminary quotient data of the divided compression data stream. The $0^{th}$ to thirty-first masks Mask_0 to Mask_31 use the number of arithmetic bits. For example, the $0^{th}$ mask Mask_0 uses 1 bit, the first mask Mask_1 uses 2 bits, the thirtieth mask Mask_30 uses 31 bits, and the thirty-first mask Mask_31 uses 32 bits.

For example, when the $k^{th}-1$ bit of the $k^{th}$ mask (Mask_k, 1≤k≤31) is 1, the $k^{th}-1$ overflow data OV[k−1] may be transferred to the $k^{th}-0$ preliminary quotient data Q[k]_[0], and when the $k^{th}-2$ bit of the $k^{th}$ mask Mask_k is 1, the $k^{th}-2$ overflow data OV[k−2] may be transferred to the $k^{th}\_0$ preliminary quotient data Q[k]_[0].

At the $N^{th}+1$ stage (Stage N), the merger 2222_2 receives the $0^{th}$ to thirty-first masks Mask_0 to Mask_31 from the mask generator 2222_1, and receives $0^{th}\_0$ to thirty-first_0 preliminary quotient data Q[31:0]_[0] and the $0^{th}$ to thirty-first overflow data OV[31:0] from the $0^{th}$ to thirty-first predecoders 2221_0 to 2221_31. The merger 2222_2 generates $0^{th}\_0$ to thirty-first_0 quotient data Q[31:0]_[0] through the following formula 1 by the adder array, and provides the quotient data to the packer 2223.

$$Q_{merge}[k]\_[0]=Q[k]\_[0]+\Sigma_{i=0}^{k-1}\text{mask}\_k[i]?OV[i]:3'h0;$$
$$(1\leq k\leq 31),$$

$$Q_{merge}[0]\_[0]=Q[0]\_[0] \qquad \text{Formula 1 (1)}$$

However, when the $k^{th}\_0$ preliminary quotient data (Q[k]_[0], 0≤k≤31) is not valid, the $k^{th}\_0$ quotient data Qmerge[k]_[0] among the $0^{th}\_0$ to thirty-first_0 quotient data $Q_{merge}$ [31:0]_[0] is not valid.

The shift index generator 2222_3 receives the $0^{th}$ to thirty-first quotient number data numC[31:0] from the $0^{th}$ to thirty-first predecoders 2221_0 to 2221_31, generates the $0^{th}$ to thirty-first shift indexes Shift[31:0] through the following formula 2 below and provide the shift indexes to the packer 2223.

Formula 2

$$\text{Shift}[k] = \sum_{i=0}^{k-1} \text{numC}[i](1 \le k - 31),$$
$$\text{Shift}[0] = 0$$

At an $N^{th}+2$ stage (Stage N+2) which is the next stage of the $N^{th}+1$ stage (Stage N), the packer 2223 receives $0^{th}\_1$ to thirty-first_1 preliminary quotient data Q[31:0]_[1], $0^{th}\_2$ to thirty-first_2 preliminary quotient data Q[31:0]_[2], and $0^{th}\_3$ to thirty-first_3 preliminary quotient data Q[31:0]_[3] from the $0^{th}$ to thirty-first_1 predecoders 2221_0 to 2221_31, receives $0^{th}\_0$ to thirty-first_0 quotient data $Q_{merge}$ 0 [11:0]_[0] from the merger 2222_2, performs $0^{th}$ to thirty-first shift indexes Shift[31:0] from the shift index generator 2222_3, and generates the first_0 to first_15 quotient data (Q1_0 to Q1_15, QD).

The packer 2223 searches for valid quotient data among the $0^{th}\_1$ to thirty-first_1 preliminary quotient data Q[31:0]_[1], the $0^{th}\_2$ to thirty-first_2 preliminary quotient data Q[31:0]_[2], the $0^{th}\_3$ to thirty-first_3 preliminary quotient data Q[31:0]_[3], and the $0^{th}\_0$ to thirty-first_0 quotient data $Q_{merge}$[31:0]_[0], and sequentially arranges the first_0 to first_15, quotient data (Q1_0 to Q1_15, QD) for valid quotient data, using the $0^{th}$ to thirty-first shift indexes Shift[31:0] to perform decompression.

FIG. 18 is a diagram for explaining a specific example of the first quotient region Q1_R. When assuming that the first quotient region Q1_R is 12 bits and 12'b1100_0000_0100_1111, the $0^{th}$ to third predecoders 2221_0 to 2221_3 perform the operation, the first_0 divided compression data stream Q1_R0 is indicated as 4'b1111, the first_1 divided compression data stream Q1_R1 is indicated as 4'b0100, the first_2 divided compression data stream Q1_R2 is indicated as 4'b0000, and the first_3 divided compression data stream Q1_R3 is indicated as 4'b1100.

Each of the $0^{th}$ to third predecoders 2221_0 to 2221_3 outputs $0^{th}$ to third divided data DD0 to DD3 based on the first_0 to first_3 divided compression data streams Q1_R0 to Q1_R3 as follows.

According to the first_0 divided compression data stream Q1_R0, since the separator data (D, 1'b1) is placed in Q1_R0[0], Q1_R0[1], Q1_R0[2], and Q1_R0[3] inside the first_0 divided compression data stream Q1_R0, the $0^{th}$ bypass data BP[0] is 0, and the $0^{th}$ quotient number data numC[0] is 4. Therefore, the $0^{th}\_0$ to $0^{th}\_3$ preliminary quotient data Q[0]_[3:0] are valid, and some or all of the $0^{th}\_0$ to $0^{th}\_3$ preliminary quotient data Q[0]_[3:0] indicate 0. The $0^{th}$ overflow data OV[0] is 0.

According to the first_1 divided compression data stream Q1_R1, since the separator data (D, 1'b1) is placed in Q1_R1[2] inside the first_1 divided compression data stream Q1_R1, the first bypass data BP[1] is 0, and the first quotient number data numC[1] is 1. Therefore, the first_0 preliminary quotient data Q[1]_[0] is valid, and the first_0 preliminary quotient data Q[1]_[0] indicates 2. The first overflow data OV[1] is 1.

According to the first_2 divided compression data stream Q1_R2, since there is no separator data (D, 1'b1) in the first_2 divided compression data stream Q1_R2, the second bypass data BP[2] is 1, the second quotient number data numC[2] is 0. Therefore, some or all of the second_0 to second_3 preliminary quotient data Q[2]_[3:0] are not valid and the second overflow data OV[2] is 4.

According to the first_3 divided compression data stream Q1_R3, since the separator data (D, 1'b1) is placed in Q1_R1[2], Q1_R1[3] inside the first_3 divided compression data stream Q1_R3, the third bypass data BP[3] is 0, and the third quotient number data numC[3] is 2. Therefore, the third_0 and third_1 preliminary quotient data Q[3]_[1:0] are valid, the third_0 preliminary quotient data Q[3]_[0] indicates 2, and the third_1 preliminary quotient data Q[3]_[1] indicates 0. The third overflow data OV[3] is 0.

The mask generator 2222_1 receives the $0^{th}$ to third bypass data BP[3:0], generates valid first mask Mask_1 and third mask Mask_3, and transfers the first mask Mask_1 and third mask Mask_3 to the merger 2222_2.

The $0^{th}$ mask Mask_0 is not defined, and the second mask Mask_2 is not generated because the second_0 preliminary quotient data Q[2]_[0] is not valid. The first mask Mask_1 indicates 2'b10, and the third mask Mask_3 indicates 4'b1100.

The merger 2222_2 receives the $0^{th}$ to third overflow data OV[3:0] from the $0^{th}$ to third predecoders 2221_0 to 2221_3, and receives the first mask Mask_1 and the third mask Mask_3 from the mask generator 2222_1 to generate $0^{th}\_0$ to third_0 quotient data $Q_{merge}$[3:0]_[0]. According to the aforementioned formula 1, the $0^{TH}\_0$ quotient data $Q_{merge}$[0]_[0] is 0, the first_0 quotient data $Q_{merge}$[1]_[0] is 2, the third_0 quotient data $Q_{merge}$[3]_[0] is 7, and the second_0 quotient data $Q_{merge}$[2]_[0] is not defined because the second_0 preliminary quotient data Q[2]_[0] is not invalid. The generated $0^{th}\_0$ quotient data $Q_{merge}$[0]_[0], first_0 quotient data [1]_[0] and third_0 quotient data $Q_{merge}$[3]_[0] are transferred to the packer 2223.

The shift index generator 2222_3 receives the $0^{th}$ to third quotient number data Shift[3:0] from the $0^{th}$ to third predecoders 2221_0 to 2221_3 to generate $0^{th}$ to third shift indexes Shift[3:0], and transfers the third shift indexes to the packer 2223. According to the above formula 2, the $0^{th}$ shift index Shift[0] is 0, the first shift index Shift[0] is 4, the second shift index Shift[2] is 4, and the third shift index Shift[3] is 5.

The packer 2223 may output a plurality of quotient data QD of data of 7'h0720000 through the $0^{th}$ to third shift indexes Shift[3:0], the preliminary quotient data and the quotient data.

Figure 19:
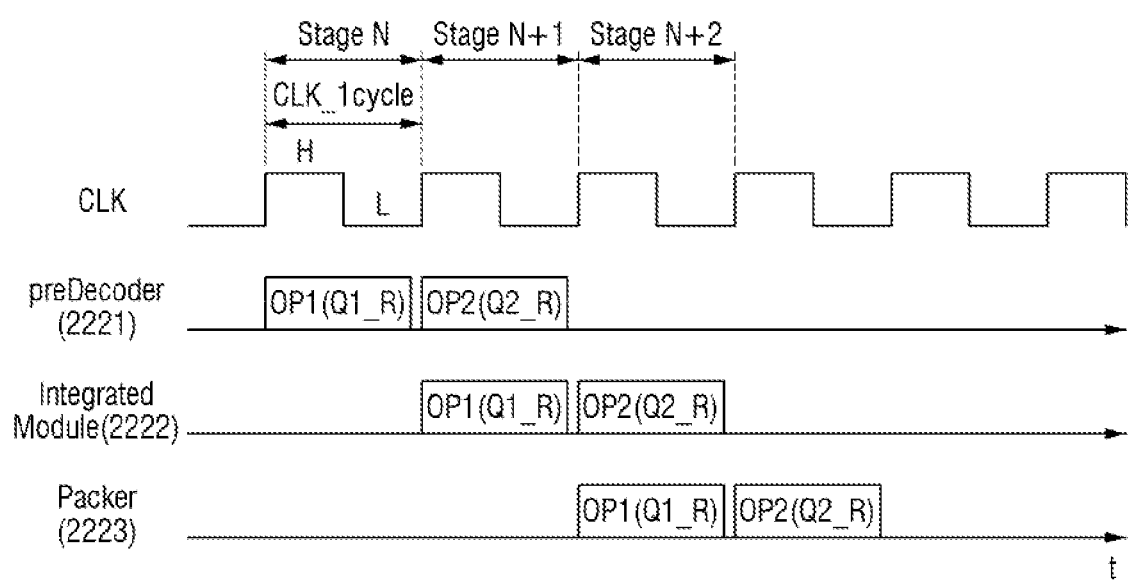
FIG. 19 is a diagram for explaining the operation of the image processing device according to some embodiments of the present disclosure.

FIG. 19 is a diagram for explaining the operation of the image processing device according to some embodiments of the present disclosure.

Referring to FIGS. 10, 12, 16, 17, and 19, the operations of the $0^{th}$ to thirty-first predecoders 2221_0 to 2221_31 of the first quotient region Q1_R are performed at the $N^{th}$ stage (Stage N), and the operation of the integration module 2222 of the first quotient region Q1_R may be performed at the $N^{th}+1$ stage (Stage N+1).

The operation of the integration module 2222 of the first quotient region Q1_R is performed at the $N^{th}+1$ stage (Stage N+1), and the $0^{th}$ to thirty-first predecoders 2221_0 to 2221_31 may perform the operation of the second quotient region Q2_R to output the plurality of divided data.

According to the operation of FIG. 19 as described above, since the decoder 220 according to some embodiments of the present disclosure performs a pipelined operation, the speed and efficiency of entire decoding/decompression output (throughput) of the block (B, see FIG. 9) or the image frame F can be improved.

Example embodiments have been disclosed herein, and although specific terms are employed, the terms are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An image processing device comprising:
   a multimedia processor that processes raw data of an image frame to generate image data, wherein the image frame comprises at least a first pixel, a second pixel, and a third pixel; and
   a frame buffer compressor comprising a decoder that decompresses a first compression data stream to generate a first output data, wherein the first compression data stream comprises compressed first image data of the first pixel,
   wherein the decoder comprises:
      a first predecoder that divides the first compression data stream into a predetermined number of bits to generate a first divided compression data stream, and the first predecoder outputs first divided data based on the first divided compression data stream,
      a second predecoder that divides the first compression data stream into the predetermined number of bits to generate a second divided compression data stream different from the first divided compression data stream, and the second predecoder outputs second divided data based on the second divided compression data stream, and
      a merger that receives the first divided data and the second divided data and performs a decompression operation on the first compression data stream based on the first divided data and the second divided data, wherein the decompression operation comprises generating first merge data based on the first divided data, generating second merge data based on the first divided data and the second divided data, and combining the first merge data and the second merge data.

2. The image processing device of claim 1, wherein the frame buffer compressor further comprises an encoder that compresses the first image data by a variable bit rate (VBR) mode to output the first compression data stream.

3. The image processing device of claim 1, wherein, while the merger performs the decompression operation on the first compression data stream:
   the first predecoder divides a second compression data stream into the predetermined number of bits to generate a third divided compression data stream, wherein the second compression data stream comprises second image data of the second pixel compressed by a variable bit rate (VBR) mode, and the first predecoder outputs third divided data based on the third divided compression data stream; and
   the second predecoder divides the second compression data stream into the predetermined number of bits to generate a fourth divided compression data stream, and the second predecoder outputs fourth divided data based on the fourth divided compression data stream.

4. The image processing device of claim 3, wherein the first pixel and the second pixel are placed in a same block inside the image frame.

5. The image processing device of claim 1, wherein the first compression data stream is compressed by a Golomb-Rice mode.

6. The image processing device of claim 5, wherein third image data of the third pixel is compressed into the first compression data stream, the first compression data stream comprising:
   a first region including first quotient data of the first image data and second quotient data of the third image data, and
   a second region including first residual data of the first image data and second remainder data of the third image data, wherein the decoder receives the second region before the first region.

7. The image processing device of claim 6, wherein:
   the first predecoder divides the first region into the predetermined number of bits to generate the first divided compression data stream, and
   the second predecoder divides the first region into the predetermined number of bits to generate the second divided compression data stream.

8. The image processing device of claim 5, wherein:
   the first divided data comprises first preliminary quotient data and first overflow data, and
   the second divided data comprises second preliminary quotient data and second overflow data.

9. The image processing device of claim 8, wherein the merger forms quotient data for the first compression data stream based on the second preliminary quotient data and the first preliminary quotient data.

10. An image processing device comprising:
   a multimedia processor that processes raw data of an image frame to generate image data, wherein the image frame comprises at least a first pixel, a second pixel, and a third pixel; and
   a frame buffer compressor comprising a decoder that decompresses a first compression data stream to generate a first output data, wherein the first compression data stream comprises compressed first image data of the first pixel compressed by a Golomb-Rice mode or a variable bit rate (VBR) mode,
   wherein the decoder comprises:
      a first predecoder that generates a first divided compression data stream including at least a part of the first compression data stream, and the first predecoder outputs first preliminary quotient data of the first compression data stream based on the first divided compression data stream,
      a second predecoder that generates a second divided compression data stream including at least a part of the first compression data stream different from the first divided compression data stream, and the second predecoder outputs second preliminary quotient data of the first compression data stream based on the second divided compression data stream, and a merger that receives the first preliminary quotient data and the second preliminary quotient data, and the merger performs a decompression operation on the first compression data stream based on the first preliminary quotient data and the second preliminary quotient data, wherein the decompression operation comprises generating first merge data based on the first divided data, generating second merge data based on the first divided data and the second divided data, and combining the first merge data and the second merge data.

11. The image processing device of claim 10, wherein:
the first predecoder divides the first compression data stream into a predetermined number of bits to generate the first divided compression data stream, and
the second predecoder divides the first compression data stream into the predetermined number of bits to generate the second divided compression data stream.

12. The image processing device of claim 10, wherein, while the merger performs the decompression operation on the first compression data stream:
the first predecoder generates a third divided compression data stream including at least a part of a second compression data stream, wherein the second compression data stream comprises second image data of the second pixel compressed by the Golomb-Rice mode, and the first predecoder outputs third divided data based on the third divided compression data stream; and
the second predecoder generates a fourth divided compression data stream including at least a part of the second compression data stream different from the third divided compression data stream, and the second predecoder outputs fourth divided data based on the fourth divided compression data stream.

13. The image processing device of claim 10, wherein third image data of the third pixel is compressed into the first compression data stream, the first compression data stream comprising:
a first region including first quotient data of the first image data and second quotient data of the third image data, and
a second region including first remainder data of the first image data and second remainder data of the third image data, wherein the decoder receives the second region before the first region.

14. The image processing device of claim 13, wherein:
the first predecoder divides the first region into a predetermined number of bits to generate the first divided compression data stream, and
the second predecoder divides the first region into the predetermined number of bits to generate the second divided compression data stream.

15. The image processing device of claim 10, wherein the merger forms quotient data for the first compression data stream based on the second preliminary quotient data and the first preliminary quotient data.

16. A method for operating an image processing device, the method comprising:
receiving a first compression data stream generated by compressing a first image data of a first pixel by a variable bit rate (VBR) mode;
equally dividing the first compression data stream into a predetermined number of bits to generate a first divided compression data stream and a second divided compression data stream, wherein each of the first divided compression data stream and the second divided compression data stream includes preliminary quotient data and overflow data, wherein the overflow data indicates a value to be transferred to next preliminary quotient data of a next divided compression data stream;
outputting a first divided data based on the first divided compression data stream;
outputting a second divided data based on the second divided compression data stream; and
decompressing the first compression data stream based on the first divided data and the second divided data to output first output data of the image data.

17. The method for operating the image processing device of claim 16, wherein the first compression data stream is compressed by a Golomb-Rice mode.

18. The method for operating the image processing device of claim 16, further comprising:
decompressing the first compression data stream based on the first divided data and second divided data;
equally dividing a second compression data stream compressed on a second image data of a second pixel different from the first pixel by a variable bit rate mode into the predetermined number of bits; and
generating a third divided compression data stream and a fourth divided compression data stream.

19. The method for operating the image processing device of claim 16, wherein the first divided compression data stream includes bypass data for indicating a state of a previous overflow data transfer.

* * * * *